Patented July 7, 1942

2,288,662

UNITED STATES PATENT OFFICE 2,288,662

COOKING OLEAGINOUS MATERIAL

Fred W. Weigel, Knoxville, Tenn.

No Drawing. Application July 21, 1938,
Serial No. 220,515

2 Claims. (Cl. 260—412.2)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government for govermental purposes without the payment to me of any royalty thereon.

This invention relates to a process for the heat treatment of foodstuff material, particularly non-mineral oleaginous materials, either for preparation as a comestible or subsequent extraction of oil therefrom.

One of the objects of this invention is to provide a process for rapidly and uniformly heating foodstuff material for its conversion into intermediate or finished products. Another object of this invention is to provide a process for the heat treatment of foodstuff material in a minimum length of time. Still another object of this invention is to provide a process for the heat treatment of foodstuff material which will reduce to a minimum and substantially eliminate the danger of overtreatment of some portions of a charge of such material while other portions of the charge remain undertreated. A further object of this invention is to provide a process for the heat treatment of foodstuff material in which the moisture content of the material may be controlled within predetermined limits. Other objects of this invention include the provision of a process for the heat treatment of foodstuff material at sub-atmospheric pressure, atmospheric pressure or super-atmospheric pressure, depending upon the characteristics of the material being treated and conditions necessary to accomplish certain of the other objects of this invention.

The heat treatment of foodstuff material, either for preparation as a comestible or for the extraction of oil therefrom, is as old as civilization itself. Countless proposals relating to processes for accomplishing the desired results have been made and many of these proposals have been placed in actual operation. The net result of these proposals to date is that such organic materials are heat treated at relatively low temperatures for relatively long periods of time. This may, of course, be satisfactory for occasional operation but, when used in ordinary manufacturing operations, it involves not only excessive capital outlay but materially reduced production and yields.

I have discovered a process for the rapid and economical heat treatment of foodstuff material, particularly nonmineral oleaginous material, either for preparation as a comestible or for the subsequent extraction of oil therefrom, which includes the combination of transferring heat to such material from the heating surface at a definite rate and subjecting the material adjacent to the heating surface to agitation such that the movement of substantially all such material bears a substantially direct proportion to the rate at which the heat is transferred to the material.

It is evident that there are numerous factors which will influence conditions for the most satisfactory operation of my invention, the actual limits of which cannot be established except by a detailed study of each set of raw materials and the intermediate and finished products involved.

My process may be used for the rapid and efficient heat treatment of foodstuff material, either for preparation of such material as a comestible or for subsequent extraction of oil or other constituents therefrom. My process is particularly suitable for the heat treatment of oil-bearing material, including but not limited to oil-bearing seeds or nuts of vegetable origin, such as babasu nut, castor bean, cottonseed, flax-seed, hemp seed, mustard seed, citicicia nut, perilla seed, ramie seed, rape seed, sesame seed, soybean, sunflower seed, and tung nut. Although such material may be treated directly, it is preferable that any portion of such material to be treated which may be removed by chemical or physical means, such as hulls or shells, will be so removed. After such extraneous material has been removed, the material should ordinarily be partially disintegrated or its shape otherwise changed, such as by cracking, grinding or rolling, in order that rapid heat transfer through the particles may be obtained.

Heat is transferred to the unprepared or prepared material from a heating surface and the material adjacent to the heating surface is so agitated that a general relationship exists between the thermal input to the material so treated through a substantial portion of the period for which heat is transferred to the material and the movement of substantially all of the material adjacent to the heating surface. Such relationship may be represented by treatment under the following conditions: transferring heat to nonmineral foodstuff material from a heating surface at a rate of 10 to 15 British thermal units per pound of material per minute through a substantial portion of the period for which heat is transferred to the material, while maintaining substantially uniform temperatures throughout the mass of such material, and subjecting the material adjacent to the heating surface to agitation such that the movement of substantially all of such material adjacent to the heating surface is in the order of 300 to 400 feet per minute; or transferring heat to such material from a heating surface at a rate of at least five British thermal units per pound of material per minute through a substantial portion of the period for which heat is transferred to the material, while maintaining substantially uniform temperatures throughout the mass of such material, and subjecting the material adjacent to the heating surface to agitation such that the movement of substantially all of such material adjacent to the heating surface is in the order of at least 200 feet per minute.

Similarly, heat is transferred to the unprepared or prepared material from a heating surface and the material adjacent to the heating surface is so agitated that a general relationship exists between the rate of rise in temperature through a substantial portion of the period for which heat is transferred to the material and the movement of substantially all of the material adjacent to the heating surface. Such relationship may be represented by treatment under the following conditions: transferring heat to nominal foodstuff material from a heating surface at a rate such that the temperature of material is raised in the order of 30° F. per minute through a substantial portion of the period for which heat is transferred to the material, while maintaining substantially uniform temperatures throughout the mass of such material, and subjecting the material adjacent to the heating surface to agitation such that the movement of substantially all of such material adjacent to the heating surface is in the order of 300 to 400 feet per minute; or transferring heat to such material from a heating surface at a rate such that the temperature of the material is raised in the order of 15° F. per minute through a substantial portion of the period for which heat is transferred to the material, while maintaining substantially uniform temperatures throughout the mass of such material, and subjecting the material adjacent to the heating surface to agitation such that the movement of substantially all of such material adjacent to the heating surface is in the order of at least 200 feet per minute.

Raw foodstuff materials generally contain at least a sufficient water content to result in the production of some steam when such materials are brought to temperatures above the temperature of condensation for steam on the material. In some instances, it is desirable to cook such materials in an atmosphere containing a low partial pressure of water vapor. It is generally preferred to heat all such materials, particularly at temperatures above the temperature for condensation of steam on the material, in an atmosphere containing a high partial pressure of water vapor. Should the water content of the row material be low, water or steam may be added to produce the proper partial pressure of water vapor in the system during the heating operation; or should the water content of the raw material be high it may be either partially dried before cooking or, preferably heated in the cooking operation to a temperature above the temperature of condensation of steam on the material and the excess water withdrawn in the form of steam.

As heretofore stated, this invention relates to quick cooking of foodstuff material as compared with the time of 60 to 90 minutes usually required for cooking such material in plant-size scale operation. The actual time for this quick cooking will, of course, vary with the initial temperature of the raw foodstuff material and the extent to which such material is to be cooked. The total time generally required for raising foodstuff material from average atmospheric temperatures to the end of the cooking operation as performed in accordance with this invention is from 10 to 20 minutes where the maximum temperature attained is in the order of 130° to 140° C.

It will be seen, therefore, that this invention actually may be carried out by the use of various modifications and changes without departing from its spirit and scope, with only such limitations placed thereon as are imposed by the prior art.

This application is a continuation-in-part of my application Serial No. 199,043, filed March 30, 1938.

I claim:

1. A method of preparing oil bearing seeds for the separation of oil therefrom which comprises transferring heat to said material from a heating surface at a rate of at least five British thermal units per pound of material per minute through a substantial portion of the period for which heat is transferred to the material, subjecting the material adjacent to the heating surface to agitation such that the movement of substantially all of said material is in the order of at least 200 feet per minute, and maintaining the material in direct contact with steam when the material is at temperatures above the temperature for condensation of steam on the material.

2. A method of preparing oil bearing seeds for the separation of oil therefrom which comprises transferring heat to said material from a heating surface at a rate such that the temperature of the material is raised in the order of 30° F. per minute through a substantial portion of the period for which heat is transferred to the material, subjecting the material adjacent to the heating surface to agitation such that the movement of substantially all of said material is in the order of 300 to 400 feet per minute, and maintaining the material in direct contact with steam when the material is at temperatures above the temperature for condensation of steam on the material.

FRED W. WEIGEL.